Oct. 19, 1965 G. DORNBERGER ETAL 3,213,361

COMPUTER FOR MAKING CALCULATIONS INVOLVING SIGNAL FREQUENCIES

Filed Jan. 11, 1961 4 Sheets-Sheet 1

INVENTORS
G. DORNBERGER
W. M. SMITH
By A. J. Nugent
ATTORNEY

INVENTORS
G. DORNBERGER
W. M. SMITH
By A. J. Nugent
ATTORNEY

COMPUTER FOR MAKING CALCULATIONS INVOLVING SIGNAL FREQUENCIES

Filed Jan. 11, 1961 4 Sheets-Sheet 3

INVENTORS
G. DORNBERGER
W. M. SMITH
BY A. J. Nugent
ATTORNEY

COMPUTER FOR MAKING CALCULATIONS INVOLVING SIGNAL FREQUENCIES

Filed Jan. 11, 1961 4 Sheets-Sheet 4

INVENTORS
G. DORNBERGER
W. M. SMITH
BY A. J. Nugent
ATTORNEY

United States Patent Office 3,213,361

Patented Oct. 19, 1965

3,213,361
COMPUTER FOR MAKING CALCULATIONS INVOLVING SIGNAL FREQUENCIES

Georg Dornberger, Union, and William M. Smith, Jersey City, N.J., assignors to Western Electric Company, Incorporated, New York, N.Y., a corporation of New York Filed Jan. 11, 1961, Ser. No. 81,962
18 Claims. (Cl. 324—62)

This invention relates to computers, and particularly computing apparatus for making calculations involving successively occurring frequencies.

Certain computing devices, such as electronic counters, are available for counting a frequency by computing the ratio of an input signal frequency to a standard signal frequency during a predetermined time interval as determined by the time base. By inverting the procedure, that is, by computing the ratio of the standard signal frequency to the input signal frequency during a predetermined time interval, a so-called period count may be made. While such devices are known, no satisfactory counting arrangements have been provided for readily making ratio or multiplication calculations involving frequencies which occur at successive time intervals. It is, of course, conceivable that such measurements could be made by making successive counts, and then performing further calculations with computing apparatus to obtain the final result, but such procedures are obviously slow and cumbersome. In the mass production of electrical components, for instance, it is especially desirable to provide an arrangement for rapidly making precise measurements of relationships between parameters which can be equated to frequency.

An object of the invention is to provide apparatus for making computations involving signal frequencies occurring at successive intervals.

Another object is to provide counting apparatus wherein a representation of a first signal frequency is stored and used as a divisor or multiplier for a computation involving the first signal frequency and a second signal frequency.

A further object is to provide apparatus for performing calculation by converting successive measurements of parameters to signal frequencies and applying signals of said frequencies successively to a counter.

A more specific object is to provide apparatus capable of determining the negative voltage coefficient of resistance of a resistor.

In accomplishing these and other objects of the invention, there is provided a computer for dividing or multiplying first and second successive factors in terms of frequency, which includes a counter for measuring the period or frequency. The computer includes an input for applying a signal of one frequency and an input for applying a signal of a standard frequency, a variable time base input, and an output. A memory or register is connectible to the counter output for storing a count based on a signal frequency applied to one of the inputs while the standard signal frequency is applied to the other input. Means are provided for feeding back the stored count to the time base input to provide a new time base for the counter. A signal of another frequency is then applied to one input and the signal of the standard frequency is applied to the other input.

If it is desired to measure the ratio of two frequencies, the computer is set for a frequency count for the first input signal frequency and for a period count for the second input signal frequency with the first frequency count acting as the new time base. If one frequency is to be multiplied by the other, the frequency count is repeated for the second measurement.

One example of the use of the invention relates to determining the negative voltage coefficient of resistance of a resistor. In making such a calculation a first voltage proportional to the specified voltage applied across the resistor is derived and converted to a signal of a first frequency and later a second voltage proportional to the second specified voltage applied across the resistor is derived and converted to a signal of a second frequency. The two signal frequencies are employed as previously explained to obtain a ratio representative of the negative voltage coefficient of the resistor.

The invention provides an extremely versatile, inexpensive computer particularly useful in automatic production calculations in which the relationship of two or more successively measured factors must be determined for control purposes. In addition to solving equations involving division and multiplication, the inventive principle is a flexible tool capable of a wide range of applications. The calculation of the negative voltage coefficient of resistance illustrates but one of myriad forms that the invention may take.

The invention will be more readily understood from the detailed description which follows when read in conjunction with the drawings wherein.

Figure 1:
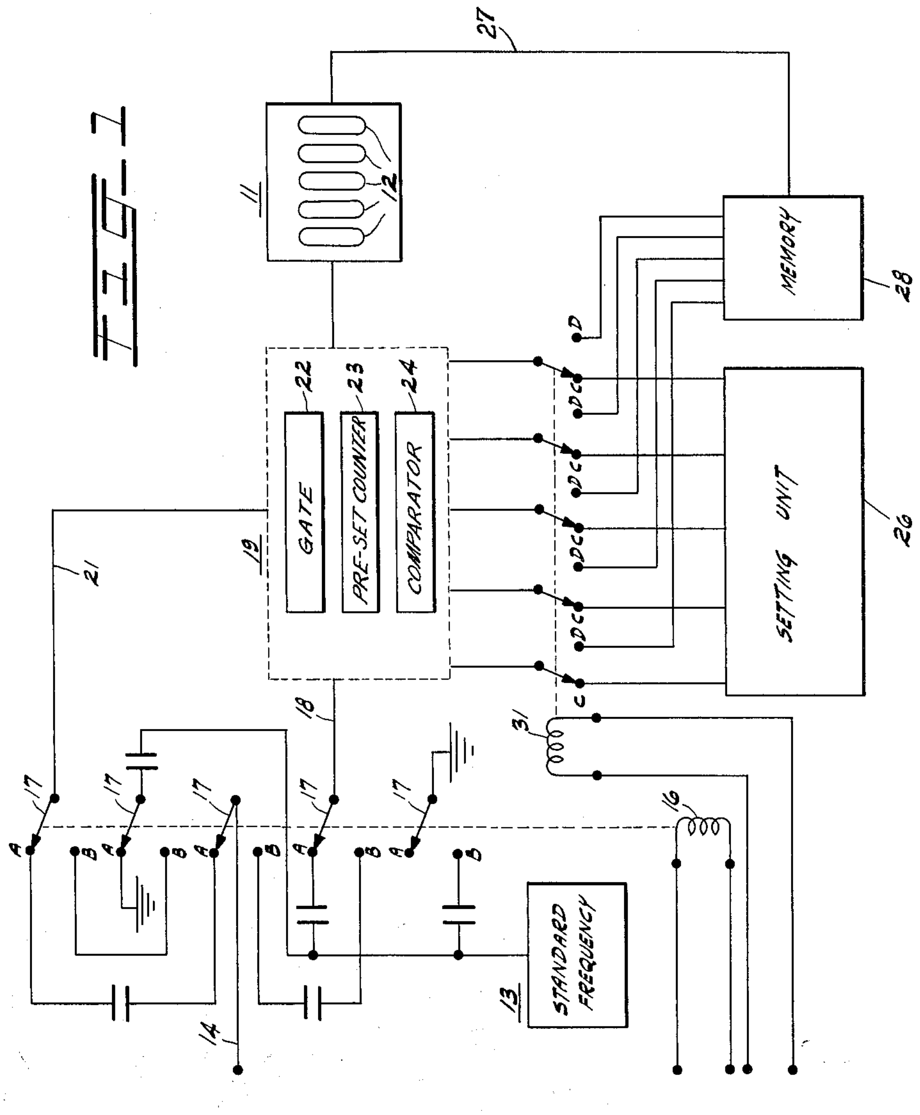
FIG. 1 is a schematic circuit diagram illustrating the invention.

The invention will first be described with special reference to FIG. 1, it being understood that those portions of the drawing which represent conventional and commercially available equipment known in the art need not be described in detail. The counting apparatus includes a counter 11 which records and visually displays a frequency or period count. While a five-decade counter is shown, this, of course, is only for the purpose of illustration and, in practice, a counter having a greater or lesser number of digits could be used. The counter is provided with a binary register section and a decimal register section, the latter providing a visual numerical display indicated by the oblong slots 12.

The counting apparatus includes a standard frequency source 13 for providing a signal of a standard frequency, e.g., 10 kc., which may be derived from a crystal-controlled oscillator by means of a frequency divider to furnish one of the two signal inputs of the computing system. The other signal input is applied from lead 14. Relay 16, which is suitably controlled by a manual or automatic switch, moves contacts 17 to their "A" or frequency count position, or to their "B" or period count position. In the "A" position, the standard signal $f_s$ is applied over an obvious path to the input 18 coupled to the control apparatus designated generally as 19, while an input signal $f_1$ on lead 14 is applied over input 21 to the control apparatus 19. When a period count is to be made, the switches 17 are actuated to their "B" position and the inputs are reversed. In other words, the standard signal $f_s$ now appears at the input 21 and another signal $f_2$ appears at the input 18. The control apparatus may include a gate section 22, a pre-set counter 23 and a comparator 24, all conventional components. The control apparatus is ordinarily set by means of a setting unit 26 so that the counter indicates a multiple or sub-multiple of a time unit, for example, multiples of one second or two seconds, or sub-multiples of one-tenth of a second, or two-tenths of a second. The comparator provides a series of reference voltages while the function of the pre-set counter is to build up staircase voltages from the input 18. The gate is "opened" at a predetermined time and when the staircase voltages, in response to a signal of a particular frequency appearing at the input 18, reach a certain level determined by the comparator, the gate 22 is "closed," halting the operation of the counter 11. During the open condition, the signal applied at 21 passes through the gate 22 to actuate the counter 11.

The apparatus thus far described operates in most respects in accordance with conventional counting procedures. In accordance with the present invention, the counter 11 provides an output 27 which is fed to a memory or register 28. When the switches 17 have been set to the "A" position and a frequency count is registered in the counter 11, on application of an input signal $f_1$ at lead 14, the count is stored in the memory 28. This is done with relay 31 actuated to its "C" position. Suitable manual or automatic switches may be provided to control relay 31. After the frequency count has been made, relay 31 operates the switches to the "D" position so that memory 28 in fact replaces the setting unit 26 and establishes a new time base comprising the stored count, for the control apparatus 19. Relay 16 now operates the switches 17 to their "B" position for a period count in the manner previously explained. The reading now appearing in the counter 11, on application of signal $f_2$, represents the ratio between the input signal $f_1$ applied at 14 for the count and the second input signal frequency $f_2$ applied at 14 for the period count. As previously indicated, the frequencies may be multiplied by maintaining the switches 17 at their "A" position when the signal $f_2$ is applied at input 14. The operations performed in the sequence described will produce a reading on the counter which is the ratio $f_1/f_2$. Reversal of the above procedure, that is, a period count followed by a frequency count can produce the same result, the ratio $f_2/f_1$.

That the last-mentioned reading represents the ratio of two frequencies is evident from the following brief analysis in which $f_1$ and $f_2$ are successively applied input frequencies, $f_s$ is a standard frequency, and $K_1$ a time base.

$$N_F \text{ (frequency count)} = \frac{f_1}{f_s} \cdot K_1 = K_2 \qquad (1)$$

On application of $f_2$, using $K_2$ as the new time base, we have $$N_P \text{(period count)} = \frac{f_s}{f_2} \cdot K_2 \qquad (2)$$

By substituting for $K_2$, we have $$\frac{f_s}{f_3} \cdot \frac{f_1}{f_s} \cdot K_1 = \frac{f_1}{f_2} \cdot K_1 \qquad (3)$$

When the selected time base $K_1$ is one second or a decimal multiple or sub-multiple thereof, it may be disregarded and the ratio $f_1/f_2$ remains.

Figure 2:
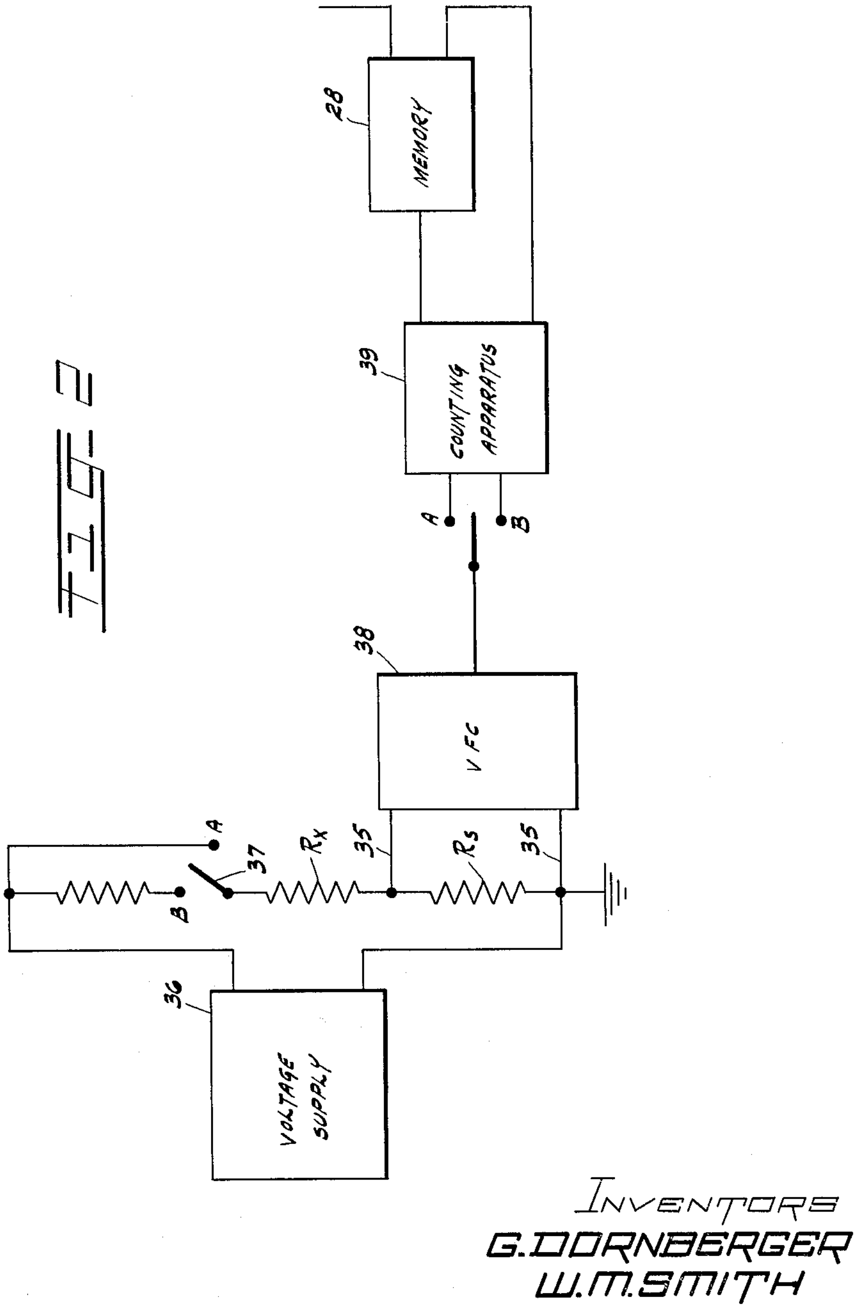
FIG. 2 is a schematic circuit diagram for computing the voltage coefficient of resistance.

With reference to FIG. 2, one particular application of the invention, for determining the voltage coefficient of resistance, will be explained. The definition for the voltage coefficient of resistance may be expressed by the following equation:

$$V_c = \frac{\frac{R_a - R_b}{R_b}}{(E_a - E_b)} \qquad (4)$$

Where $R_a$ and $R_b$ respectively represent the magnitude of the resistance when successive voltages $E_a$ and $E_b$ are applied.

By reduction of Equation 4:

$$V_c = \frac{\frac{R_a}{R_b} - 1}{\Delta E} \qquad (5)$$

where $\Delta E = (E_a - E_b)$, disregarding the constant $\Delta E$, the significant portion of a voltage coefficient measurement may be expressed in simple terms as follows:

$$V_c = \frac{R_a}{R_b} - 1 \qquad (6)$$

In FIG. 2, a voltage supply 36 supplies current for a voltage divider comprising an unknown resistor $R_x$ to be tested and a standard resistor $R_s$. The standard resistor $R_s$ may be of the wire wound type having a zero voltage coefficient of resistance, or in terms of Equation 6, having unity ratio. A switch 37, when in the "A" position supplies a relatively high voltage to the voltage divider and, when in the "B" position provides a relatively low voltage thereto. Conveniently, the ratio of the high voltage to the low voltage may be 10:1. As an example, the high voltage in the "A" position may be 101 volts with a 100-volt drop across resistor $R_x$ and a one-volt drop across the standard resistor $R_s$. In the "B" or low voltage position, the combined voltage across $R_x$ and $R_s$ may be 10.1 volts to produce a voltage drop of 0.099 volt across the standard resistor $R_s$. The output leads 35 across the standard resistor $R_s$ are coupled to a voltage-to-frequency converter 38 which may be arranged in such a manner that an input voltage of one volt produces an output of 100 kc. It will thus be apparent from the foregoing explanation that with the switch 37 in the high voltage position, there will be a one-volt drop across $R_s$ and hence an output frequency of 100 kc. from the voltage frequency converter 38, whereas when the switch 37 is in the low voltage position "B," the output voltage across $R_s$ will be 0.099 volt and the output frequency of the frequency converter 38 will be 9.9 kc. It will be appreciated that since the voltage drop across the resistor $R_s$ is inversely proportional to the value of resistor $R_x$, which can readily be shown mathematically, by means of the arrangement shown in FIG. 2, and with reference to the Equation 6, the voltage coefficient of resistance may be obtained regardless of the fact that the measurements are made at successive intervals of time. The block 39 in FIG. 2 may be considered the equivalent of the circuit shown in FIG. 1, with the exception of the memory 28, the disclosure of which is repeated in FIG. 2.

Actually, the counter will furnish a ratio reading that is close to 10. This is accounted for by the voltage ratio (10:1) used for the measurements. The counter is thus read as if a decimal point appeared before the first recorded digit. Simplifying, a reading of 9.5870, for example, is correctly read as: .95870. While operating requirements dictated the use of a ratio of 10:1, this happens to be especially convenient for a counter operating on a decimal basis; other ratios could, of course, be used.

It should be noted, in the above example, with reference to Equation 6, that the frequency count for $R_a$ is 100 kc. and for $R_b$ is 9.9 kc.

From the standpoint of simple electrical considerations, since the successive measurements across $R_s$ are inversely proportional to $R_a$ and $R_b$:

$$R_a \propto \frac{1}{100 \text{ kc.}} \qquad (7)$$

$$R_b \propto \frac{1}{9.9 \text{ kc.} \times 10} \qquad (8)$$

Hence, $$\frac{R_a}{R_b} = \frac{9.9 \times 10}{100} \qquad (9)$$

Where the factor 10 takes into account the ratio of ten of the test voltages 10:10.1, $$\frac{R_a}{R_b} = \frac{99}{100} = 0.99 \qquad (10)$$

and from Equation 6, $$V_o=\frac{R_a}{R_b}-1=0.99-1.=-0.01 \quad (11)$$

Figure 3:
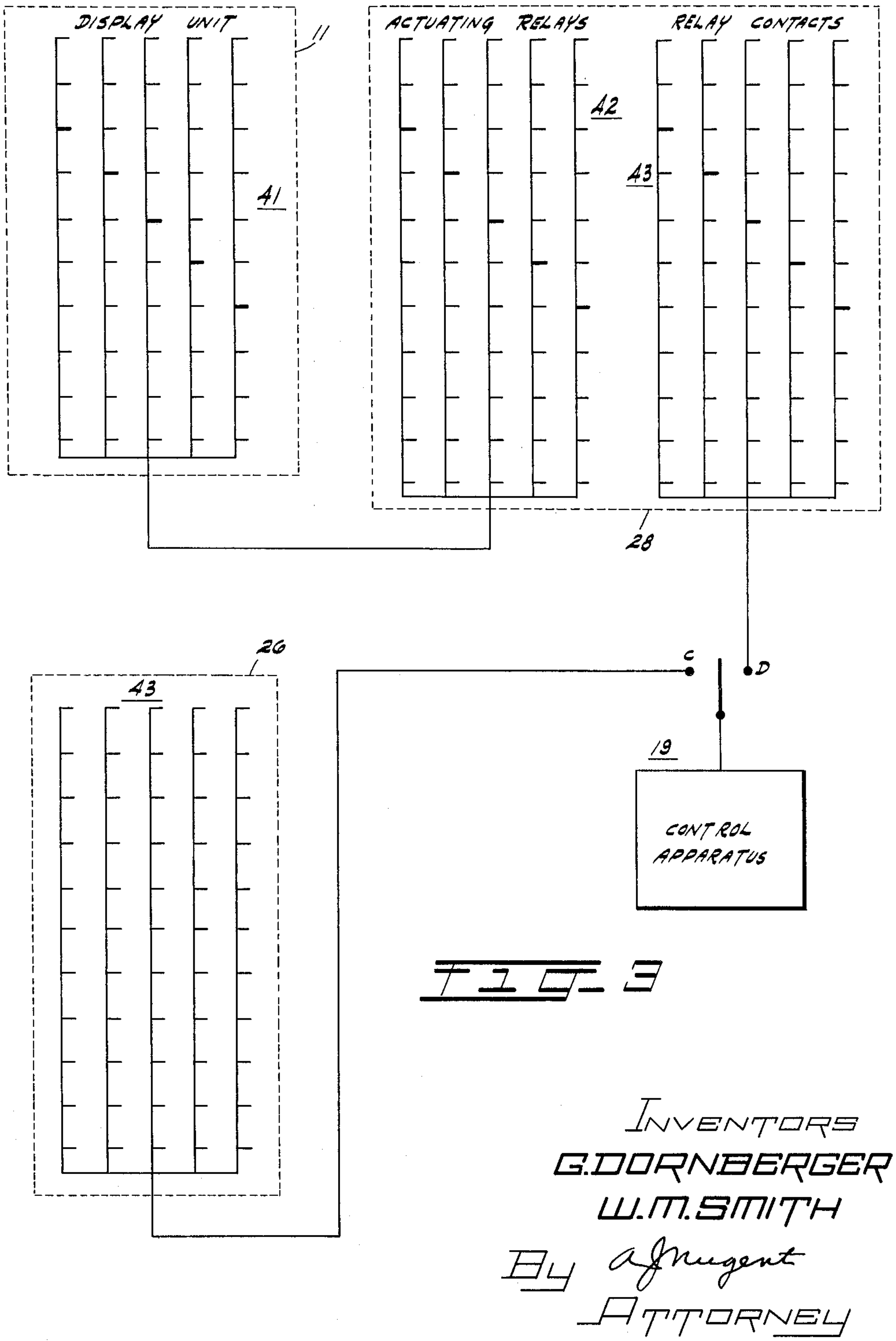
FIG. 3 is a schematic diagram illustrative of a wiring arrangement which may be used in the present invention.

In FIG. 3, the numeral 41 represents a wiring arrangement for the register in the counter 11, while 42 and 43 schematically illustrate, respectively, relays and their contact closures in the memory 28. Also schematically illustrated in FIG. 3 is the setting unit 26, the contact arrangement for which is shown at 43. As previously explained, when the switches operable by the solenoid 31 are in their "C" position, the multiplier provides the time base for the counting apparatus, whereas when the switches are in their "D" position, the time base is supplied from the memory.

Figure 4:
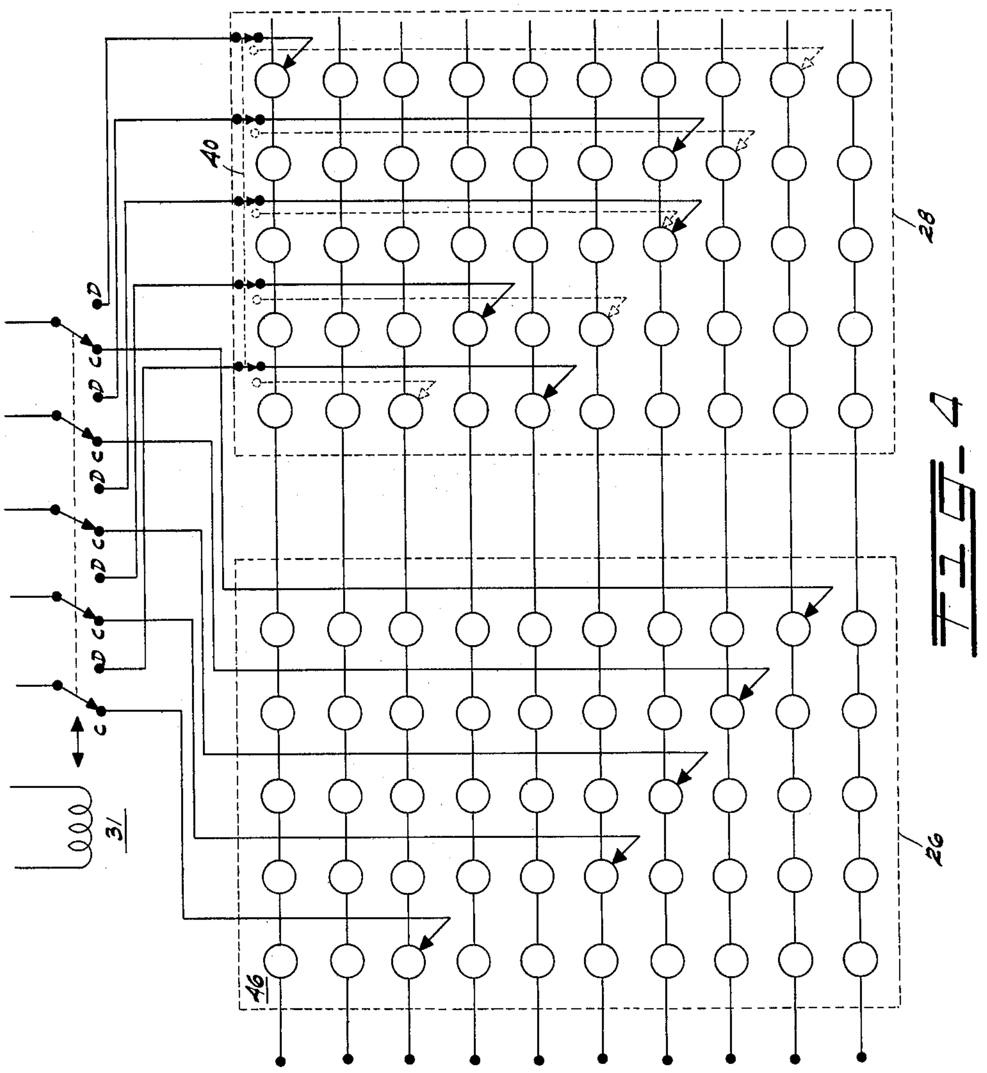
FIG. 4 is a diagram of the two systems used for setting the time base of the counting apparatus.

FIG. 4 shows at the left a matrix 46 of the setting unit 26 and at the right a matrix for the memory 28. In the illustrated examples, the setting unit 26 has a setting of 74321 in the decimal code, and the memory 28 has a setting of 56339 in the decimal code. FIG. 4 also shows how the setting unit 26 may be eliminated by providing a switching means 40 to set the control apparatus for the first time base from the memory 28. This would be done with the switches controlled by relay 31 in their "D" positions. In dotted lines, a setting of 74321, identical to that in the setting unit 26, is shown. Obviously, other fixed settings could be wired into the memory 28 and controlled by the switching means.

It is to be understood, of course, that the counting apparatus includes suitable means for erasing the previous count prior to a new count. While only one memory is shown, one or more additional memories could be provided to retain stored information particularly where complex calculations are involved. Further, other means of feeding back a count registered in the counter 11 may be used.

Various changes may be made in the invention as described, without departing from the ambit of protection.

What is claimed is:

1. A computer for making calculations involving signal frequencies comprising a counter, control means for said counter, means for applying successive input signals to said control means to make successive counts, means for applying a signal of a standard frequency to said control means for selective comparison with the respective frequencies of said input signals each time a count is to be made, a memory operable by said counter for storing a count, and means for feeding back a stored count from said memory to said control means to establish a time base for said control means during a succeeding count which is dependent on the value of the stored count.

2. A computer according to claim 1, wherein the control means includes a time base input, there being means for applying a first time base to the time base input for one count, said means for feeding back the stored count providing a different time base for a succeeding count.

3. A computer according to claim 2, wherein successively occurring signal frequencies are derived from successive voltage measurements of an electrical component, said component forming at least one series resistance element of a voltage divider network.

4. A computer according to claim 1, wherein the memory includes a series of relays providing contact closures representative of the stored count.

5. A computer for dividing first and second successive signal frequencies, comprising a counter for making a frequency dependent count, a control circuit, a first input connected to said control circuit for applying the signal of the first frequency, a second input connected to said control circuit for applying a signal of a standard frequency, a time base input, means connected to said control circuit for applying a time base to said time base input, an output for said counter, a memory connectible to the counter output for storing a count based on the first input, means for feeding back the stored count to the time base input to provide a new time base, means for applying the signal of the standard frequency to the first input, and means for applying the signal of the second frequency to the second input.

6. A computer for multiplying first and second successive signal frequencies, comprising a counter for making a frequency dependent count, a control circuit, a first input connected to said control circuit for applying the signal of the first frequency, a second input connected to said control circuit for applying a signal of a standard frequency, a time base input connected to said control circuit, means for applying a time base to said time base unit, an output for said counter, a memory connectible to the counter output for storing a count based on the first input, means for feeding back the stored count to the time base input to provide a new time base, and means for applying the signal of the second frequency to the first input and means for applying a signal of the standard frequency to the second input.

7. A computer for measuring the voltage coefficient of a resistor comprising means for making successive voltage measurements of the resistor at different voltages, means for converting said voltage measurements to successive signal frequencies, a counter, control means for said counter, means for applying signals of said successive signal frequencies to said control means to make successive counts, means for applying a signal of a standard frequency to said control means each time a count is to be made, a memory operable by said counter for storing a count, and means for feeding back said stored count from said memory to said control means to vary the operation of said control means during a succeeding count.

8. A computer according to claim 7, wherein the control means includes a time base input, there being means for applying a first time base to the time base input for one count, said means for feeding back the stored count providing a different time base for a succeeding count.

9. A computer according to claim 1, including switching means to control the application of said signals to said inputs.

10. A computer according to claim 8, including switching means to control the application of said time bases to said time base input.

11. A computer according to claim 7, wherein the means for making successive voltage measurements comprises a voltage divider which includes the resistor to be measured and a standard resistor, the output across the standard resistor being fed to the converting means.

12. A computer according to claim 11, wherein the standard resistor has a unity voltage coefficient of resistance.

13. A computer for making calculations involving successively occurring signal frequencies comprising a counter, control means for applying successive input signals to said counter to make successive counts, means for applying a signal of a standard frequency to said control means each time a count is to be made, a memory operable by said counter for storing a count, means for feeding back said stored count from said memory to said control means to vary the operation of said control means during a succeeding count, switching means for controlling the successive application of said input signals and the signal of said standard frequency to said control means in accordance with whether a frequency or a period count of an input signal frequency is to be made.

14. A computer according to claim 13 wherein means are provided for deriving successive signal frequencies from parameters whose relationship is to be determined.

15. A computer according to claim 13, wherein the control means includes a time base input, there being means for applying a first time base to the time base input for one count, said means for feeding back the stored count providing a different time base for a succeeding count.

16. A computer according to claim 15, including switching means for selectively applying the time base inputs to said time base input.

17. A computer for making calculations involving successively occurring signal frequencies comprising a counter, control means for successively applying input signals to said counter, said control means including a time base control, and means for feeding back a count registered in said counter to said time base control to provide a time base for a succeeding count.

18. A computer according to claim 17 wherein the feed-back means includes a memory for storing the count, and switching means for setting said time base control from said memory for a first count, a stored count being fed back from said memory to the time base control for a succeeding count.

References Cited by the Examiner

UNITED STATES PATENTS

| | | | |
|---|---|---|---|
| 2,539,673 | 1/51 | Peterson | 324—79 |
| 2,590,641 | 3/52 | Musk | 324—79 |
| 2,862,185 | 11/58 | Dick | 235—132 X |
| 2,413,664 | 11/59 | Wang | 324—79 X |
| 2,919,401 | 12/59 | Cole et al. | 324—79 |
| 2,925,555 | 2/60 | Gordon | 324—78 |
| 2,933,248 | 4/60 | Steele | 235—132 X |
| 2,951,986 | 9/60 | Gordon | 324—79 |
| 2,992,384 | 7/61 | Malbrain | 324—79 X |
| 3,006,549 | 10/61 | Hughes | 235—132 X |
| 3,112,478 | 11/63 | Ostroff | 324—78 X |

WALTER L. CARLSON, *Primary Examiner.*

SAMUEL BERNSTEIN, *Examiner.*

UNITED STATES PATENT OFFICE

CERTIFICATE OF CORRECTION

Patent No. 3,213,361 October 19, 1965

Georg Dornberger et al.

It is hereby certified that error appears in the above numbered patent requiring correction and that the said Letters Patent should read as corrected below.

Column 3, line 30, strike out "frequency" and insert the same after "the", first occurrence, in line 29, same column 3; same column 3, lines 53 and 54, for that portion of equation (3) reading $$\frac{f_s}{f_3} \quad \text{read} \quad \frac{f_s}{f_2}$$

column 4, line 72, for "10:10.1" read -- 101:10.1 --.

Signed and sealed this 18th day of October 1966.

(SEAL)

Attest:

ERNEST W. SWIDER

Attesting Officer

EDWARD J. BRENNER

Commissioner of Patents